United States Patent [19]

McCann et al.

[11] 4,399,446

[45] Aug. 16, 1983

[54] INK SUPPLY SYSTEM FOR AN INK JET PRINTER

[75] Inventors: James D. McCann, Waynesville; Theodore F. Williams, Beavercreek; John D. Vogel, Sagamore Hills, all of Ohio

[73] Assignee: The Mead Corporation, Dayton, Ohio

[21] Appl. No.: 340,136

[22] Filed: Jan. 18, 1982

[51] Int. Cl.[3] .......... G01D 15/18

[52] U.S. Cl. .......... 346/140 R; 346/75

[58] Field of Search .......... 346/75, 140

[56] References Cited

U.S. PATENT DOCUMENTS

| | | | |
|---|---|---|---|
| 3,661,304 | 5/1972 | Martinez | 346/75 X |
| 3,701,998 | 10/1972 | Mathis | 346/75 |
| 3,761,953 | 9/1973 | Helgeson | 346/75 |
| 3,839,721 | 10/1974 | Chen | 346/75 |
| 3,891,121 | 6/1975 | Stoneburner | 346/75 X |
| 3,970,222 | 7/1976 | Duffield | 346/75 X |
| 3,974,508 | 8/1976 | Blumenthal | 346/140 |
| 4,042,937 | 8/1977 | Perry | 346/75 X |
| 4,089,007 | 5/1978 | Perry | 346/75 X |
| 4,314,264 | 2/1982 | Bok | 346/75 X |
| 4,318,114 | 2/1982 | Huliba | 346/140 |

OTHER PUBLICATIONS

Brady et al.; Fluid Circuit for Fast Startup of an Ink Jet Head; IBM Tech. Disc. Bulletin, vol. 17, No. 5, Oct. 1974, p. 1524.

Pelkie et al.; Ink Jet Head; IBM Tech. Disc. Bulletin, vol. 18, No. 10, Mar. 1976, pp. 3206-3207.

Giordano et al.; Fast Liquid Valve, IBM Tech. Disc. Bulletin, vol. 19, No. 6, Nov. 1976, pp. 2313-2314.

*Primary Examiner*—Joseph W. Hartary

*Attorney, Agent, or Firm*—Biebel, French & Nauman

[57] ABSTRACT

An ink supply system for supplying ink to the print head of an ink jet printer includes a pump arrangement having a pump outlet for supplying ink to the print head from a supply tank through a print head supply line. A closed container communicates with the pump outlet and the print head for holding a quantity of ink therein for providing a second flow of ink to the print head at a static pressure that increases linearly with time. A valve controllably actuated by a solenoid selectively directs a portion of the ink from the pump outlet to the closed container, gradually compressing the air therein as the container is filled. Ink is thereby supplied to the print head at a gradually increasing static pressure, facilitating initiation of production of jet drop streams by the print head.

12 Claims, 3 Drawing Figures

INK SUPPLY SYSTEM FOR AN INK JET PRINTER

BACKGROUND OF THE INVENTION

The present invention relates to ink jet printers and, more particularly, to an ink supply system for supplying ink to the print head of such a printer.

An number of different types of ink supply systems have been utilized in the past for supplying ink under pressure to the print head of an ink jet printer. Typically, the print head of an ink jet printer defines a fluid reservoir to which ink is applied and at least one orifice from which a fluid filament emanates. Mechanical disturbances are applied to the fluid filaments, as for example by means of a piezoelectric transducer, to stimulate the filaments to break up into jet drop streams. As drops are formed from the fluid filaments, the drops are selectively charged and, thereafter, are deflected by an electrostatic field such that they are separated into print and catch trajectories. The drops in the print trajectories strike a print receiviing medium, such as a paper web, while the drops in the catch trajectories are directed to one or more drop catchers, which ingest the drops and return them to the fluid supply system for reuse. One such prior art printer is shown in U.S. Pat. No. 3,701,998, issued Oct. 31, 1972, to Mathis.

One type of fluid supply system which has been utilized with such ink jet printers is shown in U.S. Pat. No. 3,761,953, issued Sept. 25, 1973, to Helgeson. The Helgeson ink supply system includes a fluid recirculation path from a fluid pump to a pressure regulation tank and back to the pump. Fluid is withdrawn from the pressure regulation tank and supplied to the print head and the ink in the recirculation path is replenished from a supply tank. While providing fluid to the print head at a desired pressure, the flow rate of the ink is not controlled. Additionally, the supply system of Helgeson is relatively complicated and requires a substantial number of components.

A significant problem encountered with ink jet printers is the difficulty of providing a start up of the printer in which the jet drop streams are formed without wetting other print components. As the flow of ink through the print head orifices begins, the jet drop streams initially established tend to be somewhat unstable, both in trajectory and in drop size. This instability may also reappear at shut down of the printer as the fluid flow through orifices is terminated.

U.S. Pat. No. 4,042,937, issued Aug. 16, 1977, to Perry et al., discloses an ink supply system in which sequencing of purging, start up, print operation, and shut down of the printer are controlled by a pair of solenoid-actuated valves connected in the inlet and outlet lines of the print head. The inlet valve is connected between a pump and the print head, while the outlet valve is connected between the print head and the supply tank which provides ink to the pump. Start up is accomplished by filling the print head with ink, closing the inlet valve to permit pressure to build behind the inlet valve to a level significantly greater than that required for operation and, thereafter, opening the inlet valve. At shut down, the inlet valve is closed while the outlet valve is held open, thus creating a negative pressure in the head. The Perry et al supply system does not include a provision for controlling the fluid flow rate to the print head but, rather, simply operates with the pump providing whatever flow of ink to the head may result from the opening and closing sequences of the valves.

Another problem encountered with ink jet printers is that air may become trapped within the print head ink reservoir. Air pockets or bubbles in the print head may inhibit proper printer operation due to their compressibility. U.S. Pat. No. 3,974,508 issued Aug. 10, 1976, to Blumenthal, discloses an ink jet printer in which air bubbles are purged from the print head by passing the ink from an inlet line through the print head to an outlet line at a relatively high flow rate. This sweeps out air pockets that might otherwise remain in the print head.

An ink supply system designed for solving both problems is shown in U.S. Pat. No. 4,314,264, issued Feb. 2, 1982, to Bok et al. It has been found that within a range of subatmospheric static pressures within the print head, in particular, between approximately 2 and 11 inches of water below atmospheric pressure, that prior to start up, ink will not weep through the print head orifices nor will air be ingested thereinto. The Bok ink supply system includes a pump for providing ink under pressure from an ink supply tank to the pump outlet. Ink is then carried by a supply line to the print head, and may be returned therefrom to the ink supply tank through a return line. Additionally, a plurality of ink lines is provided for returning ink from the pump outlet to the pump inlet. Each of these lines includes a flow restriction, for providing a different fluid flow impedance within each line. A valve system is included for directing a portion of the ink from the pump outlet into a selected one of the ink return lines. By switching between the various return lines, static pressure within the print head may be brought in a stepwise fashion within the ideal start up range. A print head outlet valve may then be closed, creating a pressure shock wave which travels into and through the print head. The shock wave produces a virtual instantaneous pressure increase, sufficient to cause proper commencement of jet drop streams.

As can be readily seen, however, changes in fluid flow impedance within the ink supply system may be sufficient to alter the static pressure within the print head immediately prior to start such that it is not within the optimum pressure range. This is true not only for flow impedance changes within the return lines, but also within the entire recirculation system. Such changes may result, for example, from the deposit of dirt or particles of dried ink within the fluid system. Thus, it can be seen that adjustment of the system may be somewhat critical, if weeping or air ingestion is to be avoided.

Accordingly, it is seen that there is a need for a fluid supply system for an ink jet printer in which the supply fluid to the print head is controlled in a simple, reliable manner, and in which start up and shut down are reliably controlled.

SUMMARY OF THE INVENTION

An ink supply system for supplying ink to the print head of an ink jet printer for projection of jet drop streams includes an ink supply tank for storing a quantity of ink and pump means, having a pump inlet and a pump outlet for receiving ink from the ink supply tank at the pump inlet and for providing ink under pressure at the pump outlet. A print head supply line means provides flow of ink from the pump outlet to the print head. A closed container means communicating with the pump outlet, the ink supply tank and the print head is included for holding a quantity of ink therein, and may provide a second flow of ink to the print head at a static pressure that increases with time.

A controllable valve means selectively directs ink from the pump outlet to the closed container means. A means is provided for controllably actuating the controllable valve means such that a portion of the ink from the pump outlet is directed to the closed container means, gradually compressing the air within the closed container means as it is filled with ink, thereby supplying ink to the print head at a static pressure increasing with time.

The controllable valve means may also selectively allow ink to drain from the closed container means into the ink supply tank. The means for actuating the valve means further controllably actuates the valve means such that ink contained within the closed container means is drained into the ink supply tank.

The supply tank may include vacuum pump means for maintaining the quantity of ink within the tank at a subatmospheric pressure to reduce the amount of air in the ink.

The ink supply system may further include an ink recirculation means, having an ink return line for returning a portion of the ink from the pump outlet to the pump inlet. A second controllable valve means is included for selectively directing ink from the pump outlet to the ink return line. A second solenoid means for controllably actuating the second controllable valve means cooperates with the first controllable valve means such that a portion of the ink from the pump outlet is directed to the ink return line whenever ink is not directed by the first solenoid means to the closed container means. A flow restriction means is included in the ink return line, and is adjustable to a predetermined fluid flow impedance so that static pressure in the print head supply line means is maintained at a substantially constant level regardless of the action of the first and second valve means.

The ink supply system may further include a check valve means interposed within the fluid flow path between the closed container means and the print head. The check valve means prevents fluid flow from the print head to the closed container means, but provides substantially no fluid flow impedance to fluid flowing from the closed container means to the print head. The ink supply system may additionally include a print head return line means for returning ink from the print head to the ink supply tank. A print head outlet valve is included therein, and a third solenoid means is provided for controllably actuating the print head outlet valve. Fluid flow through the print head return line means is permitted when the print head outlet valve is open, but may be rapidly terminated upon closure of the print head outlet valve for initiating production of jet drop streams.

The closed container means may further include a pressure sensing means mounted within the closed container means and responsive to air pressure therein. A control means operated by the pressure sensor in response to a predetermined air pressure is included to cause the third solenoid means to close the print head outlet valve so as to initiate production of jet drop streams.

The method of supplying ink to the print head of an ink jet printer for producing a plurality of jet drop streams emanating therefrom includes the steps of selectively connecting the closed container means to provide fluid flow between the pump outlet and the closed container means, whereby a portion of the ink from the pump outlet is directed to the closed container means so as to gradually fill the closed container means. The air therein is compressed, providing a flow of ink to the print head at a gradually increasing static pressure, while the balance of the ink from the pump outlet is supplied to the print head through the print head supply line. Upon reaching a predetermined air pressure within the closed container means, the closed container means is disconnected from the pump outlet. The container means is then connected to the ink supply tank, thereby draining ink from the closed container means into the tank.

The method may further include the step of closing the print head outlet valve substantially simultaneously with the reaching of the predetermined air pressure within the closed container means. Ink flow through the print head is thereby rapidly terminated, so as to initiate production of jet drop streams.

The method may further comprise the steps of application of a partial vacuum to the ink supply tank and print head return line, followed by opening of the print head outlet valve. The partial vacuum thereby causes a rapid decrease in static pressure within the print head, so as to cause rapid termination of jet drop streams.

Accordingly, it is an object of the present invention to provide an ink supply system and a method of supplying ink to the print head of an ink jet printer including a pump and a closed container means, said closed container means being selectively connectable between the pump outlet and the print head; to provide such a system and method in which start up is initiated by filling of said closed container means, thereby providing a second flow of ink to the print head at a static pressure that increases linearly with time; to provide such a system and method in which start up may be initiated without weeping of ink from the print head or the ingesting of air thereinto; and to provide such a system and method in which the print head is connected to a vacuum source at shut down of the printer to produce rapid reduction in the static pressure within the print head.

Other objects and advantages of the invention will be apparent from the following description, the accompanying drawings and the appended claims.

DETAILED DESCRIPTION OF THE PREFERRED EMBODIMENT

Figure 1:
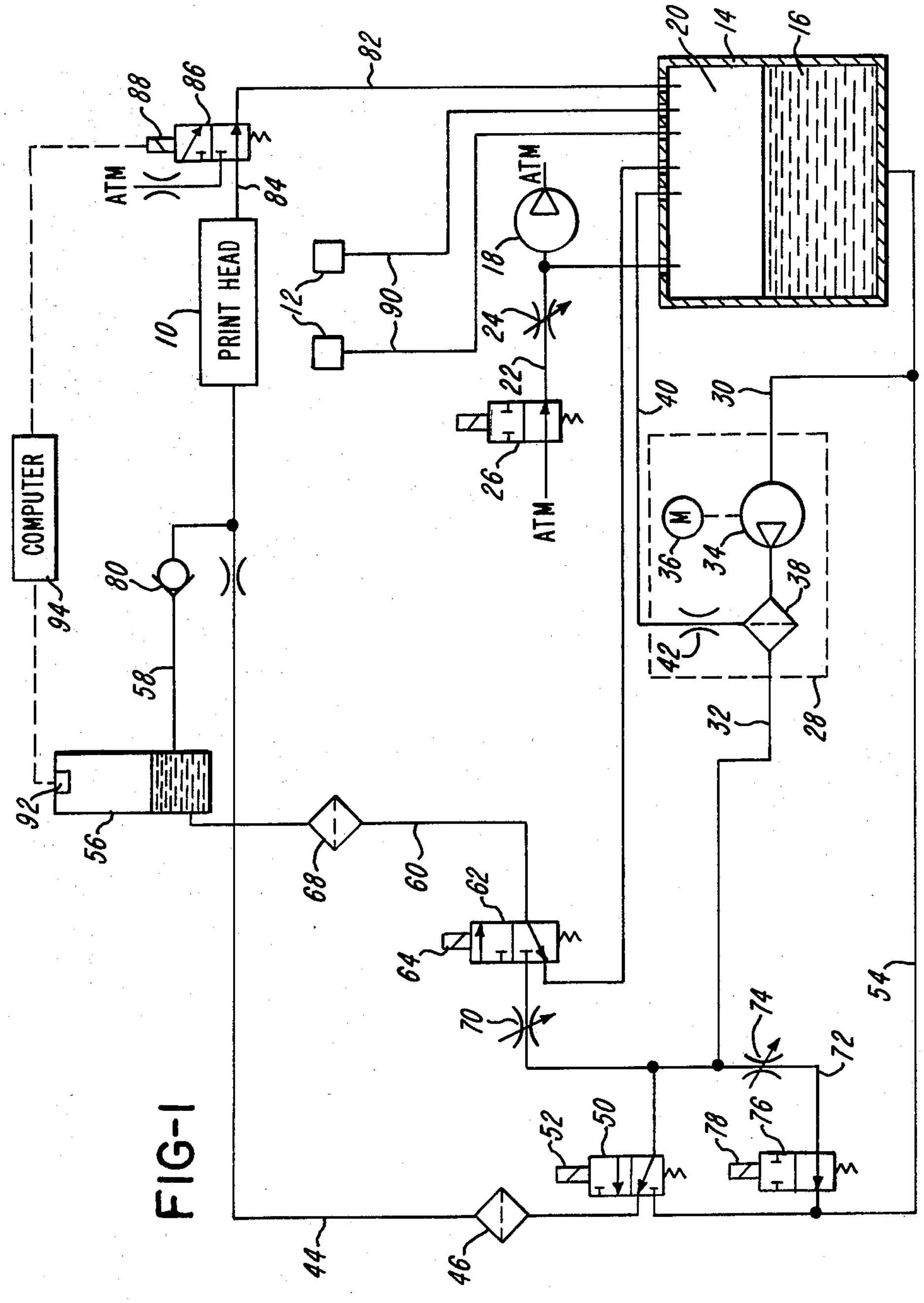
FIG. 1 is a schematic representation of the ink supply system of the present invention.

Reference is made to FIG. 1 which depicts diagrammatically the ink supply system of the present invention. The ink supply system provides ink to the print head 10 of an ink jet printer for production of jet drop streams in a known manner. Print head 10 may be any one of a number of known prior art print heads, such as shown in U.S. Pat. No. 3,701,998, issued Oct. 31, 1972, to Mathis, which produces a plurality of jet drop streams of ink for deposit on a print receiving medium. Drops which are not to be deposited upon the print receiving medium are selectively charged by charging electrodes (not shown) and deflected by an electric field to one or more drop catchers 12 for reuse by the fluid supply system. The fluid supply system includes an ink supply tank 14 which stores a quantity of ink 16 therein.

Supply tank 14 includes vacuum pump 18 which partially evacuates the air space 20 above the ink 16. Vacuum pump 18 is additionally connected to line 22, which in turn communicates with the atmosphere. Line 22 includes an air flow restriction means 24, a manually adjustable valve which provides an air flow impedance therethrough. Line 22 further includes a controllable valve 26 which is operable to open or close line 22. It will be seen that when valve 26 is open, air flow through line 22 and flow restriction means 24 will cause vacuum pump 18 to exert less vacuum upon supply tank 14 than when valve 26 is closed. Thus, the air in tank 14 may be maintained at either of two different subatmospheric pressure levels by the same vacuum pump 18.

A pump means 28, having a pump inlet 30 and a pump outlet 32, receives ink from the ink supply tank 14 at the pump inlet 30 and provides ink under pressure at the pump outlet 32. The pump means 28 includes a pump 34 powered by an electric motor 36. The pump means 28 further includes a filter 38 which is connected to the output of the pump 34 and filters the ink supply to the pump outlet 32. In order to remove any air which may accumulate within the filter 38, a bleed line 40, including a bleed restriction 42, returns to the supply tank 14 a small portion of the ink supplied to the filter 38, as well as any air which may be trapped within the filter 38.

Ink is delivered from the pump outlet 32 to the print head 10 by a print head supply line means, including print head supply line 44. A filter 46 is disposed within supply line 44, for removing debris from the ink passing therethrough. A fixed flow restriction means 48 is also disposed within supply line 44, providing a fluid flow impedance therethrough.

The supply line 44 is connected to pump outlet 32 through a controllable valve 50 actuated by solenoid means 52. Valve 50 is operable to direct ink into either supply line 44, or into an ink return or recirculation line 54 that returns the ink to the pump inlet 30.

A closed container means includes closed container 56 which is sealed from the atmosphere, and communicates with print head 10 through line 58. Closed container 56 is connected with pump outlet 32 by line 60 through a controllable valve means 62 that is controllably actuated by a solenoid means 64. Container means 56 is also connected to ink supply tank 14 by a drain line 66 that connects with line 60 at valve means 62. Valve means 62 is operable to connect closed container 56 with either pump outlet 32 or ink supply tank 14, but not both simultaneously. Line 60 further includes a filter 68 disposed therein for removing debris from ink passing therethrough, and an adjustable flow restriction means 70 for providing a fluid flow impedance to ink passing through line 60.

An ink return line 72 connects pump outlet 32 with ink recirculation line 54. Line 72 includes an adjustable flow restriction means 74 disposed therein, and a controllable valve means 76 actuated by solenoid means 78. Valve means 76 is operable to either open or closed line 72, and solenoid means 78 is operated in cooperation with solenoid means 64 so that valve means 76 and 62 are always actuated at the same time. A portion of the ink from pump outlet 32 will be directed into either line 60 or line 72, but not both simultaneously. Flow restriction means 74 is adjusted to provide a proper fluid flow impedance so that the same portion of ink from pump outlet 32 will be directed into line 72 as will be directed into line 60. Thus, the quantity of ink directed into supply line 44, and the static pressure therein, will not fluctuate when line 60 is connected or disconnected to the pump outlet 32.

A check valve 80 is disposed within line 58. Check valve 80 is selected so as to prevent fluid flow from print head 10 to closed container 56, but to provide substantially no fluid flow impedance to ink flow from closed container 56 to print head 10.

A print head return line means includes print head return line 82 connecting the print head outlet 84 of print head 10 with ink supply tank 14. A print head outlet valve 86 is disposed within return line 82, and is controllably actuated by solenoid means 88. Valve 86 is operable either to permit fluid flow through print head 10 and into return line 82, or to terminate such flow and vent return line 82 to the atmosphere. Additionally, drops of ink which are caught by catchers 12 are returned to the supply tank 14 by lines 90.

A pressure sensitive switch 92 is mounted at the top of closed container 56 and is responsive to air pressure therein. Switch 92 is connected to a control means comprising computer means 94, which is adapted to control solenoid means 88 and thereby outlet valve 86 in response to signals from switch 92. Computer means 94 may also control operation of the balance of the solenoid-actuated valves in the system.

An operational cycle for the ink supply system of the present invention is described in the following Table:

| | VALVE | | | | | |
|---|---|---|---|---|---|---|
| Step No. | 26 | 50 | 62 | 76 | 86 | Description |
| 1 | 0 | 0 | 0 | 0 | 0 | Circulate |
| 2 | 0 | 0 | 1 | 1 | 0 | Circulate/Fill |
| 3 | 0 | 0 | 1 | 1 | 1 | Start Up |
| 4 | 0 | 0 | 0 | 0 | 1 | |
| 5 | 1 | 0 | 0 | 0 | 1 | |
| 6 | 1 | 0 | 0 | 0 | 0 | Shut Down |
| 7 | 0 | 0 | 0 | 0 | 0 | Circulate |
| 8 | 0 | 1 | 0 | 0 | 0 | Bar Removal |

A "1" in the Table indicates that the solenoid associated with the valve is actuated, while a "0" indicates that the solenoid is not actuated.

Initially, as indicated at Step No. 1, the system is in a circulate mode of operation in which the print head outlet valve 86 is not actuated, so as to produce fluid flow through the print head 10 from the pump means 22, with the fluid being returned to the tank 14 via the print head return line 82. The vacuum applied by vacuum pump 18 to tank 14 causes a static pressure within print head 10 sufficiently below atmospheric pressure that air is ingested into print head 10 through the orifices therein. No jet drop streams are produced by the print head 10 during this mode of operation.

During this mode, valve means 62 is not actuated, thus no ink flows from pump outlet 32 into the closed container 56. Moreover, line 66 connects the closed container 56 with the supply tank 14, and thus with vacuum pump 18. The partial vacuum applied to closed container 56 acts to close check valve 80, and any ink which may be contained within closed container 56 is drained therefrom into supply tank 14. Valve means 76 is also not actuated, and a portion of the ink from pump outlet 32 is directed into line 72 and returned by recirculation line 54 to the pump inlet 30. The flow restriction means 74 is adjusted such that approximately 20% of the ink from pump outlet 32 is directed into line 72, while the remaining 80% is directed into supply line 44 and through print head 10.

When operation of the printer is to be initiated, it is necessary to establish the flow of fluid filaments from the print head orifices to produce the jet drop streams. As seen in Step No. 2, valve means 62 and 76 are actuated by solenoid means 64 and 78, respectively, so that ink flow through line 72 is terminated, and ink flow from pump outlet 32 to closed container 56 is begun. Flow resistance means 70 provides a predetermined amount of fluid flow impedance such that 20% of the ink from pump outlet 32 flows through line 60, and 80% of the ink continues to flow through supply line 44. Ink from line 60 flows into closed container 56, and then through line 58. Check valve 80 provides substantially no impedance to flow from container 56 to print head 10, and thus the ink combines with that from supply line 44, passing into and through print head 10.

Because the inner diameter of line 58 is smaller than that of line 60, ink flows into closed container 56 at a faster rate than it flows out, and closed container 56 gradually fills with ink. As container 56 is filled, the air contained therein is compressed. Thus, the ink leaving container 56 through line 58 is supplied to print head 10 at a static pressure which, since ink is supplied to container 56 at a constant rate, increases linearly with time. As the ink is combined with that supplied to the print head 10 through supply line 44, the static pressure within print head 10 is gradually increased.

As the static pressure within print head 10 is increased, a pressure level sufficiently close to atmospheric pressure is reached whereupon air is not ingested into print head 10 through the orifices therein. Since the flow of ink through print head 10 carries away any air bubbles which may remain within print head 10, at this point print head 10 is free of air. At the same time, however, the static pressure within the print head 10 is still sufficiently below atmospheric pressure that no weeping of ink through the orifices occurs.

Pressure switch 92 located within closed container 56 is selected so as to be responsive to the air pressure within container 56 that corresponds to the static pressure within print head 10 at which no air is ingested thereinto or ink weeps therefrom. Thus, pressure switch 92 indicates to the computer means 94 that the print head 10 is ready for the commencement of production of jet drop streams.

As seen in Step No. 3, the computer means 94 signals solenoid means 88 to actuate print head outlet valve 86, thus rapidly terminating the ink flow through the print head. As a consequence, a sudden pressure impulse is imparted to the ink in print head 10, producing a rapid flow of ink through the print head orifices and establishment of the desired jet drop streams. The pressure impulse travels through print head 10, and closes check valve 80 thereby preventing flow from print head 10 to closed container 56. The impulse is reflected off check valve 80 and fixed orifice 48 back toward print head 10. The impulse 10 is reflected off the closed outlet valve 86 and so forth until it is dissipated. Additionally, the actuation of outlet valve 86 opens the print head return line 82 to the atmosphere, thereby draining any ink therein into the supply tank 14.

Once the jet drop streams are established, the ink within container 56 may be drained as seen in Step No. 4. Valve means 62 and 78 are deactivated, thereby disconnecting line 60 from the pump outlet 32 and connecting it to drain line 66. The partial vacuum supplied to tank 14 by vacuum pump 18 is thus applied to container 56, facilitating the draining of ink therefrom. Additionally, since valve means 76 is deactivated, the portion of ink from pump outlet 32 that was being supplied to line 60 is now directed into line 72 and recirculation line 54. Thus, the ink flow through line 44 to print head 10 is unaffected by the deactivation of valve means 62.

When the printing operation is about to be completed, shut down of the printer is initiated, as seen in Step No. 5, by activating valve 26 to close line 22. The complete partial vacuum supplied by vacuum pump 18 is thus applied to tank 14, causing a pressure decrease in both tank 14 and print head return line 82.

Actual shut down of the printer occurs as shown in Step No. 6. Print head outlet valve 86 is deactuated, connecting the outlet side of the print head 10 to the evacuated supply tank 14 via the print head return line 82. The ink within the print head 10 undergoes an extremely rapid drop in pressure due to the vacuum applied to return line 82, and the flow of ink through the print head orifices is quickly terminated, producing a rapid, clean cessation of jet drop stream flow. Pressure within print head 10 is decreased sufficiently to cause the ingestion of air into the print head orifices, thereby ensuring that no weeping of ink will occur.

Following reestablishment of ink circulation through print head 10, valve means 26 may be deactivated, reducing the partial vacuum applied to ink supply tank 14 as shown in Step No. 7. Thus, the printer is returned to the circulation mode initially shown in Step No. 1, and is prepared for the next start up sequence.

For purposes of replacing the print head 10 with another, valve means 50 may be actuated as shown in Step No. 8. This permits fluid removal in the print head 10 so as to allow the inlet and outlet lines of the print head to be disconnected and a new print head installed without spillage of fluid onto other hardware, yet does not require shut down of pump means 28.

Figure 2:
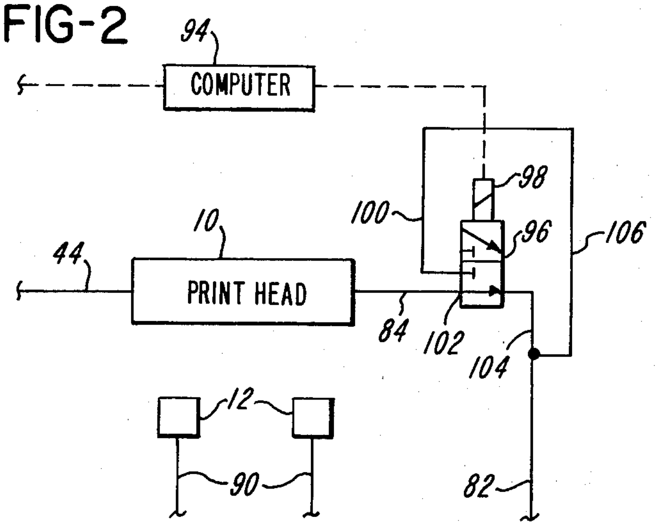
FIG. 2 is a schematic representation of a portion of the ink supply system, showing an alternative arrangement.

An alternative embodiment of a portion of the ink supply system is shown in FIG. 2. The print head outlet 84 from print head 10 is connected to print head return line 82 through a print head outlet valve 96, controllably actuated by solenoid means 98. Solenoid means 98 is connected to computer means 94, so as to be controlled by pressure sensor switch 92. While the construction and design of print head outlet valve 96 differs from that of print head outlet valve 86, it will be noted that the operational sequence of the printer as described in the Table is identical in both embodiments, with valve 96 replacing valve 86 in the Table.

Figure 3:
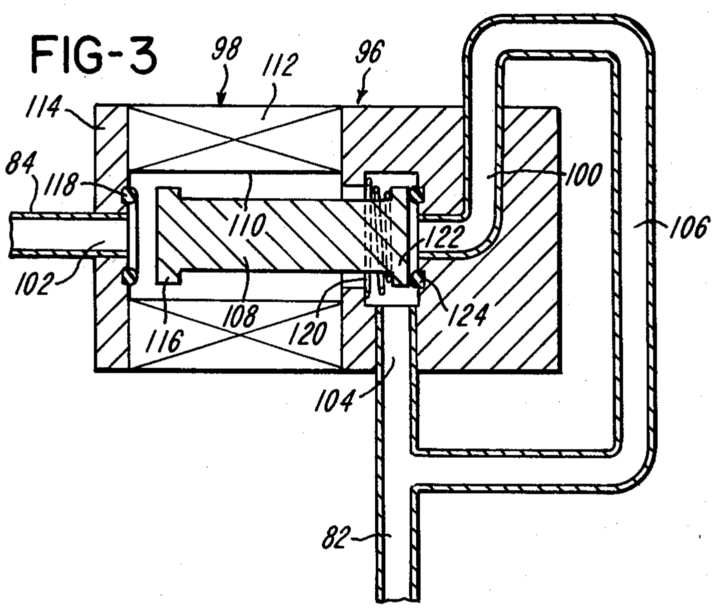
FIG. 3 is a sectional view of the print head outlet valve of FIG. 2.

Print head outlet valve 96 is shown in detail in FIG. 3, and includes a normally closed port 100 which is closed when valve 96 is deenergized and open when valve 96 is energized. A normally open port 102 connects with print head outlet 84, and is closed when valve 96 is energized. Common port 104 is always open and connects with print head drain line 82. Normally closed port 100 is also connected with drain line 82, via line 106.

Valve 96 further includes a plunger 108 disposed within cavity 110 defined within valve 96. The solenoid means 98 includes a solenoid coil 112, which for rapid operation of valve 96 preferably has a low resistance, on the order of 20 ohms. Upon energization of coil 112, a magnet pole face 114 provides a large attractive force on plunger pole face 116. This causes plunger 108 to move towards magnet pole face 114, thereby contacting fluid seal member 118, closing port 102 and opening port 100. Coil 118 is preferably powered by a relatively high voltage, on the order of 200 volts, for several milliseconds. After plunger pole face 116 and seal member 118 are in contact, however, the applied voltage may be reduced greatly, to a voltage on the order of 5 volts, to maintain valve 96 in an energized state. This applied voltage may be preferably supplied by a capacitor discharge circuit (not shown) that reduces the 200 volts to 5 volts in a few milliseconds.

Using such an electrical circuit, the time of flight of plunger 108 may be made sufficiently short to provide the necessary pressure impulse to print head 10 which results in reliable start up of the print head.

An appropriate spring means 120 is disposed about plunger 108 near the face 122 thereof opposite pole face 116, to return plunger 108 upon deenergization of solenoid coil 112 to a position contacting fluid seal means 124. Port 100 is thus closed, while port 102 is open.

As has been described, immediately prior to shut down of the printer, the partial vacuum within ink supply tank 14 and print head return line 82 is increased. This permits a more rapid pressure drop within print head 10, and thus a more reliable shut down. It will be recognized further, however, that as valve 96 is deenergized, both ports 100 and 104 are available to provide the partial vacuum to print head 10. This produces an even more rapid pressure decrease within print head 10, thereby improving reliability of the shut down process.

It will be further recognized that line 106 from port 100 of valve 96 must be oriented in a substantially vertical alignment, so that when valve 96 is energized, any fluid trapped in line 106 may drain into drain line 82 and away from valve 96. Otherwise, fluid will build up in line 106 and port 100, and when valve 96 is deenergized, plunger 108 will impact a column of fluid within port 100 and line 106, thereby creating a hydraulic transient pressure wave that will travel back toward print head 10, causing a pulse of fluid to exit the orifices therein and wetting the various printer components with ink.

It will be appreciated that the present invention provides a unique ink supply system in which the start up, shut down and print head removal operations are effectively controlled. By providing the closed container means for imparting a linear pressure increase to the print head, the various operations of the printer are controlled in a simple, reliable manner.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink supply system for supplying ink to the print head of an ink jet printer for production of jet drop streams, comprising:

an ink supply tank for storing a quantity of ink, pump means, having a pump inlet and a pump outlet, for receiving ink from said ink supply tank at said pump inlet and for providing ink under pressure at said pump outlet, print head supply line means for providing flow of ink from said pump outlet to said print head, closed container means communicating with said pump outlet, said ink supply tank, and said print head for holding a quantity of ink therein for providing a second flow of ink to said print head at a static pressure that increases with time, controllable valve means for selectively directing ink from said pump outlet to said closed container means, and means for controllably actuating said controllable valve means such that a portion of the ink from said pump outlet is directed to said closed container means, gradually compressing the air within said closed container means as said container means is filled with ink and thereby supplying the ink therefrom to said print head at a static pressure increasing with time.

2. The ink supply system of claim 1 in which said controllable valve means further selectively allows ink to drain from said closed container means into said ink supply tank, and said means for actuating said valve means further controllably actuates said valve means such that ink contained within said closed container means is drained therefrom into said ink supply tank.

3. The ink supply system of claim 1 in which said supply tank includes vacuum pump means for maintaining the air within said ink supply tank at a subatmospheric pressure to reduce the amount of air in said quantity of ink.

4. The ink supply system of claim 1 further comprising ink recirculation means, having an ink return line for returning a portion of the ink from said pump outlet to said pump inlet, a second controllable valve means for selectively directing ink from said pump outlet to said ink return line, a second solenoid means for controllably actuating said second controllable valve means in cooperation with said first controllable valve means such that a portion of the ink from said pump outlet is directed to said ink return line whenever ink is not directed by said first solenoid means to said closed container means, and flow restriction means in said ink return line adjustable to a predetermined fluid flow impedance so that fluid pressure in said print head supply line means is maintained at a substantially constant level regardless of the action of said first and second valve means.

5. The ink supply system of claim 1 further comprising check valve means interposed within the fluid flow path between said closed container means and said print head, said check valve means preventing fluid flow from said print head to said closed container means, but providing substantially no fluid flow impedance to fluid flowing from said closed container means to said print head.

6. The ink supply system of claim 1 further comprising a print head return line means for returning ink from said print head to said ink supply tank and including a print head outlet valve and third solenoid means therefor, said third solenoid means controllably actuating said print head outlet valve so as to permit fluid flow through said print head return line means when said print head outlet valve is open, and whereby ink flow through said print head may, upon closure of said print head outlet valve, be rapidly terminated for initiating production of jet drop streams.

7. The ink supply system of claim 6 further comprising pressure sensing means mounted within said closed container means and responsive to air pressure therein, and control means operated by said pressure sensor in response to a predetermined air pressure to cause said third solenoid means to close said print head outlet valve so as to initiate production of jet drop streams.

8. An ink supply system for supplying ink to the print head of an ink jet printer for production of jet drop streams, comprising an ink supply tank for storing a quantity of ink, pump means, having a pump inlet and a pump outlet, for receiving ink from said ink supply tank at said pump inlet and for providing ink under pressure at said pump outlet, print head supply line means for providing flow of ink from said pump outlet to said print head, print head return line means for providing flow of ink from said print head to said ink supply tank, closed container means communicating with said pump outlet and said print head for providing a second flow of ink to said print head, controllable valve means for selectively directing ink from said pump outlet to said closed container means, a print head outlet valve for selectively preventing flow of ink through said print head return line means, pressure sensing means mounted in an upper portion of said closed container means and responsive to air pressure therein, and control means, responsive to said pressure sensing means, to control said controllable valve means and said print head outlet valve, such that a portion of the ink from said pump outlet may be directed to said closed container means so as to gradually fill said closed container means, compressing the air therein and supplying a flow of ink to said print head at a gradually increasing static pressure, said control means further operating in response to a predetermined air pressure within said closed container means as determined by said pressure sensing means to close said print head outlet valve, thereby initiating production of jet drop streams.

9. A method of controlling the flow of ink to an ink jet print head in an ink jet printer, said printer including an ink supply tank, a pump receiving ink from said tank at a pump inlet and providing ink under pressure at a pump outlet, and a print head supply line connecting said print head and said pump outlet, comprising the steps of providing a closed container communicating with said print head for holding a quantity of ink therein, selectively connecting said closed container to provide fluid flow between said pump outlet and said closed container, whereby a portion of the ink from said pump outlet is directed to said closed container so as to fill gradually said container and to compress the air therein, providing a flow of ink to said print head at a gradually increasing fluid pressure, and the balance of the ink from said pump outlet is supplied to said print head through said print head supply line, disconnecting said closed container from said pump outlet upon reaching a predetermined air pressure within said container, and connecting said closed container to said ink supply tank, thereby draining ink from said closed container into said tank.

10. A method of controlling the flow of ink to an ink jet print head in an ink jet printer, said printer including an ink supply tank, a pump receiving ink from said tank at a pump inlet and providing ink under pressure at a pump outlet, a print head supply line connecting said print head and said pump outlet, a print head return line connecting said print head and said ink supply tank, and a print head outlet valve for controllably preventing fluid flow through said print head return line, comprising the steps of providing a closed container communicating with said print head for holding a quantity of ink therein, providing fluid flow of ink from said pump outlet through said print head supply line, said print head, and said print head return line to said ink supply tank, selectively connecting said closed container to provide fluid flow between said pump outlet and said closed container, whereby a portion of the ink from said pump outlet is directed to said closed container so as to gradually fill said container and compress the air therein, providing a flow of ink to said print head at a gradually increasing fluid pressure, and the balance of the ink from said pump outlet is supplied to said print head through said print head supply line, and closing said print head outlet valve upon reaching a predetermined air pressure within said container, rapidly terminating ink flow through said print head so as to initiate production of jet drop streams.

11. The method of claim 10 further comprising the step of disconnecting said closed container from said pump outlet substantially simultaneously with closing said print head outlet valve.

12. The method of claim 10 comprising the further steps of applying a partial vacuum to said ink supply tank and said print head return line, and opening said print head outlet valve, said partial vacuum thereby causing a rapid decrease in fluid pressure within said print head so as to cause rapid termination of jet drop streams.

* * * * *